Nov. 22, 1932.  J. R. REYBURN  1,888,568

TIRE CHAIN

Filed Dec. 15, 1930

INVENTOR.
JOHN R. REYBURN,
BY
ATTORNEY

Patented Nov. 22, 1932

1,888,568

UNITED STATES PATENT OFFICE

JOHN R. REYBURN, OF FAIRFIELD, CONNECTICUT, ASSIGNOR TO AMERICAN CHAIN COMPANY, INC., A CORPORATION OF NEW YORK

TIRE CHAIN

Application filed December 15, 1930. Serial No. 502,338.

This invention relates to anti-skid tire chains and has for an object the provision of a chain suitable for use upon wheels such as double-disc wheels having so-called dual tires of the type in which the tires on both discs are arranged side by side with a sufficient space therebetween to permit part of an anti-skid chain to be positioned between the tires.

The object of the invention is to provide a tire chain of the unit type, as distinguished from one of a set of chains connected to form a unitary assembly of cross-chains extending around the tire at intervals, and, more particularly, the invention has for an object to provide a unit chain which will extend around both of the dual tires, and has a part extending through the space between the tires, the parts of the chain being so connected as to avoid shifting of the chain in the direction of its length in use and so that the traction portion of the chain will also be free from any undesirable bellying out at the peripheral region between the tires, under the action of centrifugal force.

A further object of the invention is to provide such a chain for dual tires in which all the necessary parts are connected to form a unitary structure easily applied to the tire structure and easily removed therefrom.

The above and other features of the invention are illustrated and described fully in the accompanying drawing and specification and are pointed out in the claims.

Figure 1:
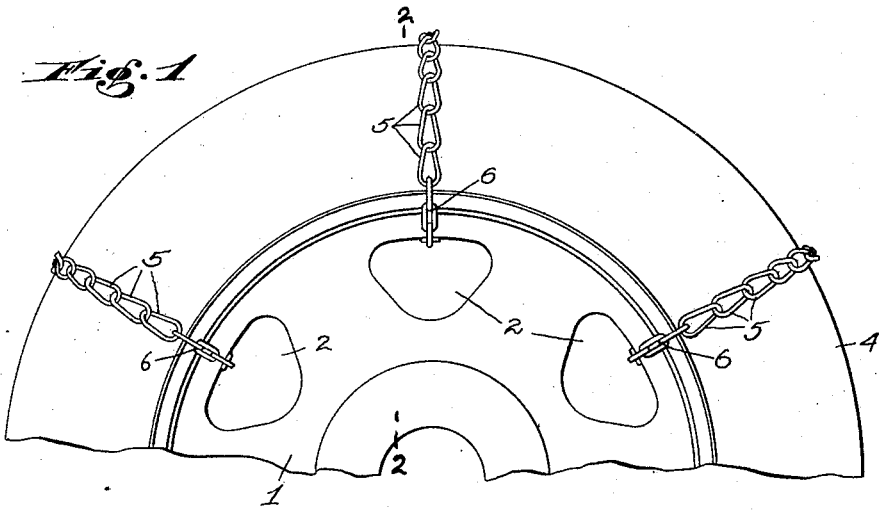
Fig. 1 is a view in side elevation of part of a wheel having dual tires of well-known type with several chains applied thereto in accordance with the present invention.

In the preferred embodiment of the invention selected for illustration and description, the part designated by the reference character 1 is part of a well-known double disc type of wheel used upon trucks and other forms of cars, and having a series of holes 2 near the rims 3 which support the twin tires 4, the above described parts being of conventional structure and forming no essential part of the present invention, as other types of wheel may be fitted with the tire-chain herein disclosed, provided that the tires of the dual-tired wheel are spaced apart to an extent which provides a through passage for a suitable connecting part of the chain hereinafter described, as distinguished from a possibly more conventional type of dual-tired wheel having only a single disc or a single row of spokes supporting a rim which carries both tires and provides no through passage between the tires, prohibiting the use of this invention.

In pursuance of the invention, there is shown a tire chain comprising in the instance illustrated a series of twisted links 5 sufficient in number to afford the desired traction surfaces when applied to the tires in the manner illustrated, the chain structure also comprising preferably a suitable number of straight links 6 to permit the chain structure to be extended through the apertures 2 in the discs of the wheel, a similar straight link or links being preferably provided also at the other end 16 of the chain structure, to which is attached preferably a connector device 7 of any suitable character, the connector illustrated being one of a well-known type having a tension member 7 and a lever 8 which may be inserted through the end link 9 of the chain, or any desired link near that end suitable to permit the chain to be connected up and tightened in place for use.

In further pursuance of the invention the chain is provided with a part 10 adapted to extend between the tires 4 in order to serve as a connection between the traction portions 5 and the connecting links 6.

The part 10 may be formed in any suitable manner, as for example by using a series of straight links, of which one is connected, say to the link 11, between the traction portions 5 while the other end link 12 is connected with a larger ring or link 13, of a size adapted to permit the connecting links 6 to pass through readily, for which purpose the ring 13 is positioned between the discs 1 near the holes 2.

Figure 2:
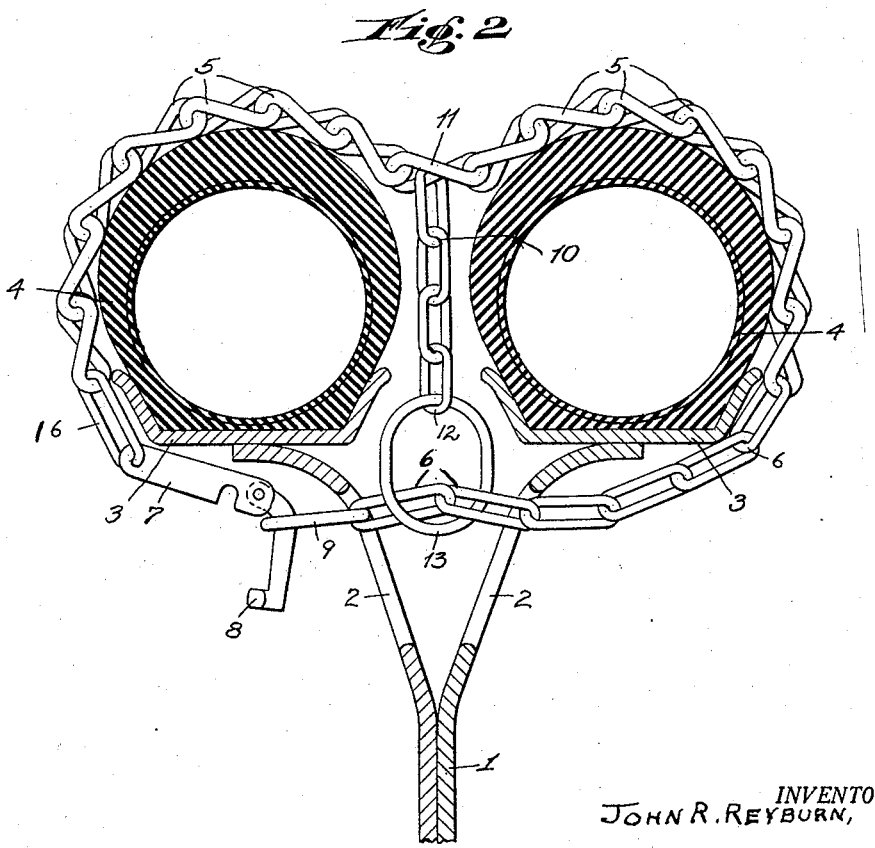
Fig. 2 is a view in vertical section taken on the line 2—2, and upon a larger scale.

The manner of applying the chain will be readily understood from Fig. 2, and when so applied, it will be readily understood that the connecting part 10 not only prevents the chain from shifting in the direction of its length to such an extent that the traction links 5 will be displaced from their operative position, but the part 10 serves also to hold the middle portion of the chain in such a manner that there is no undesirable bellying out of that part of the chain to an extent that would cause objectionable wear, noise, vibration, or contact with the wheel housing.

In the drawing the tires 4 are shown in outline only, inasmuch as obviously the chain may be applied to either a pneumatic tire or a solid tire structure, the interior of the tire not effecting the operation of the device materially.

I claim:

1. An anti-skid tire chain for vehicle wheels of the type having dual tires mounted in spaced relation upon the periphery of the wheel, said chain comprising a part embodying a series of links sufficient in length to extend around both tires and the supporting rim structure, and a part adapted to extend between said tires, said part serving when in place upon the wheel to connect the chain parts above said tires and beneath said rim structure, and acting to prevent displacement of said chain in the direction of its length.

2. An anti-skid tire chain for vehicle wheels of the type having dual tires mounted in spaced relation upon the periphery of the wheel, said chain comprising a part embodying a series of links sufficient in length to extend around both tires and the supporting rim structure, and a part adapted to extend between said tires, said part serving when in place upon the wheel to connect the chain parts above said tires and beneath said rim structure, and acting to prevent displacement of said chain in the direction of its length and also to prevent radial displacement by centrifugal force of the portion of said chain which extends across the space between the tires.

3. A tire chain as in claim 1, further characterized by a series of traction links forming the road-engaging portion of the chain, a series of connector links in continuation of said traction series and forming the part of said chain adapted to pass beneath the wheel rim structure, a connecting and tightening device adapted to connect the free ends of said two series of links together in place when extended around the tires and rim structure, and a series of links connected at one end with said traction series and having a link or ring of suitable size to be traversed by links of said connecting series.

4. A tire chain as in claim 1, further characterized by a relatively long stretch of links comprising a series of twisted traction links connected in tandem relation with a series of straight connector links, said stretch of links having a terminal connecting and tightening device adapted to be engaged with a selected link at or near the other terminal of said long stretch of chain, and a relatively short stretch of links one end link of which is permanently articulated with a link of said longer stretch, the free end of said shorter stretch having a ring.

5. The combination with a vehicle wheel of the type having dual tires mounted in spaced relation upon the periphery of the wheel, of a tire-chain comprising a part embodying a series of anti-skid links extending around both tires and around the supporting rim structure, and a part extending through the space between said tires and connecting the chain parts outside of said tires with the part inside of the rim structure, and adapted to prevent displacement of said chain in the direction of its length and also to prevent radial displacement by centrifugal force of the portion of said chain which extends across the space between the treads of the tires.

6. An anti-skid device for vehicle wheels of the type having dual tires mounted in spaced relation on the periphery of the wheel, said device comprising an anti-skid portion of sufficient length to extend across the tread portion of both tires, a flexible securing member connecting the ends of said anti-skid portion and adapted to pass over the rim structure, and a part adapted to extend between said tires, said part serving when in place upon the wheel to connect the anti-skid portion and the said flexible securing member and acting to prevent displacement of said device in the direction of its length.

7. An anti-skid device for vehicle wheels of the type having dual tires mounted in spaced relation on the periphery of the wheel, said device comprising an anti-skid portion of sufficient length to extend across the tread portion of both tires, a flexible securing member connecting the ends of said anti-skid portion and adapted to pass over the rim structure, and a part adapted to extend between said tires, said part serving when in place upon the wheel to connect the anti-skid portion and the said flexible securing member and acting to prevent displacement of said device in the direction of its length, and also acting to prevent radial displacement by centrifugal force of the said anti-skid portion.

In testimony whereof, I have signed this specification.

JOHN R. REYBURN.